March 10, 1970 J. H. LEMELSON 3,499,976

MAGNETIC RECORDING APPARATUS AND METHOD FOR MOVING A TRANSDUCER INTO ENGAGEMENT WITH A SELECTED PORTION OF A RECORD

Filed Oct. 2, 1964 2 Sheets-Sheet 1

INVENTOR.
JEROME H. LEMELSON

INVENTOR.
JEROME H. LEMELSON

United States Patent Office 3,499,976
Patented Mar. 10, 1970

3,499,976
MAGNETIC RECORDING APPARATUS AND METHOD FOR MOVING A TRANSDUCER INTO ENGAGEMENT WITH A SELECTED PORTION OF A RECORD

Jerome H. Lemelson, 85 Rector St., Metuchen, N.J. 08840

Continuation-in-part of application Ser. No. 142,748, Aug. 28, 1961, which is a division of application Ser. No. 515,417, June 14, 1955, which in turn is a continuation-in-part of application Ser. No. 225,173, Aug. 27, 1962, which is a continuation-in-part of application Ser. No. 668,348, June 27, 1957. This application Oct. 2, 1964, Ser. No. 401,064
Int. Cl. H04n *5/78;* G11b *5/54, 21/12*
U.S. Cl. 178—6.6 4 Claims

ABSTRACT OF THE DISCLOSURE

A magnetic recording apparatus and method are provided employing one or more transducers which are operative for the purpose of generally reproducing selected information from or recording signals onto selected portions of a magnetic recording member such as a tape but not the whole length of the tape during a single operation. Signal transducing is effected by sliding engagement of the transducer with a surface of the tape which results in erosion of both the tape and the transducers. To reduce said erosion or wear on the transducing means and tape, automatic means are provided to effect engagement of the two only when substantially the selected portion of the tape is aligned with the transducing means. The movement of the tape and transducing means into and out of engagement with each other is controlled by electrical signals which are generated when selected portions of the tape pass the transducing means.

RELATED APPLICATIONS

This is a continuation-in-part of my copending application Ser. No. 142,748 filed on Aug. 28, 1961, said copending application being a division of application Ser. No. 515,417 filed on June 14, 1955, now U.S. Patent 3,003,109 issued on Oct. 3, 1961. The present application is further a continuation-in-part of my copending application Ser. No. 225,173 filed on Aug. 27, 1962, said copending application being a continuation-in-part of application Ser. No. 668,348 filed on June 27, 1957, now U.S. Patent 3,051,777 which issued Aug. 28, 1962.

In the recording of signals on magnetic tape and the selective reproduction of signals from portions of the tape, reproduction is conventionally effected by engagement of the transducing head with the tape during the entire interval the tape is driven to cause the portion thereof containing the signal selected for reproduction to move past said head. As a result, over an extended period of operation wear on both tape and transducer head is substantial. Furthermore, those portions of the tape which are not scanned for reproduction therefrom may be subject to distortion or erasure of portions of the signals recorded thereon due to erosion of the tape during the many cycles in which it engages the transducing head, and the passage of particles between the head and tape. The result is that the tape and head must be replaced after a certain number of reproduction cycles which may only involve the transducing of only a small portion of the signals recorded on the tape per cycle.

Accordingly, it is a primary object of this invention to provide an improved magnetic recording apparatus of the type operative to reproduce signals from but a selected portion of a magnetic tape by engagement of the reproduction head with said tape, said apparatus being operative to selectively engage and selectively disengage tape and reproduction head so as to reduce the time the head is engaged with the tape and thereby reduce wear between tape and head and distortion of the recorded signal.

Another object is to provide a magnetic recording system for recording document information in the form of television picture signals on magnetic tape and the like, and for selectively reproducing said document signals, said apparatus being operative to effect minimum wear between tape and reproduction head during reproduction of selected video picture signals by retaining the head disengaged during a searching function until the leading portion selected picture signal recording is substantially close to the head.

Another object is to provide a magnetic recording apparatus including an erasure transducer for signals on a magnetic recording member and means for normally maintaining said transducer away from the recording member so as to reduce the possibility of accidental erasure of recorded signals.

Another object is to provide a magnetic recording apparatus including a magnetic tape and a plurality of transducers which are normally disengaged from the tape except during transducing relative to a selected portion of the tape, thereby reducing the generation of unwanted noise signals along portions of the tape containing information signals.

With the above and such other objects in view as may hereinafter more fully appear, the invention consists of the noval construction, combination and arrangement of parts, as will be hereinafter more fully described, and illustrated in the accompanying drawings wherein are shown embodiments of the invention, but it is to be understood that changes, variations and modifications may be resorted to which fall within the scope of the invention as claimed.

The magnetic recording and reproduction systems described herein employ means for selectively magnetically recording and reproducing signals with respect to selected portions of a magnetic recording member such as a magnetic tape. Signals in the video range, 2.5 to 4.0 megacycles or higher, require that the transducer be in engagement with the tape to effect recording and reproduction functions. Yet it is desireable that the head(s) not engage the tape during the movement of the tape prior to appearance of that portion containing selected information or onto which selected information is desired to be recorded, at the transducer. Accordingly, means are provided for engaging the transducer and tape just as the selected portion of the tape approaches or is in alignment with the transducer.

In order to simplify the drawings, block diagram notations are resorted to and where not illustrated, it is assumed that the correct power supplies, diodes and controls are provided on the correct side of all switches, counters, relays, transducers, servos and the other illustrated apparatus.

Figures 1, 2:
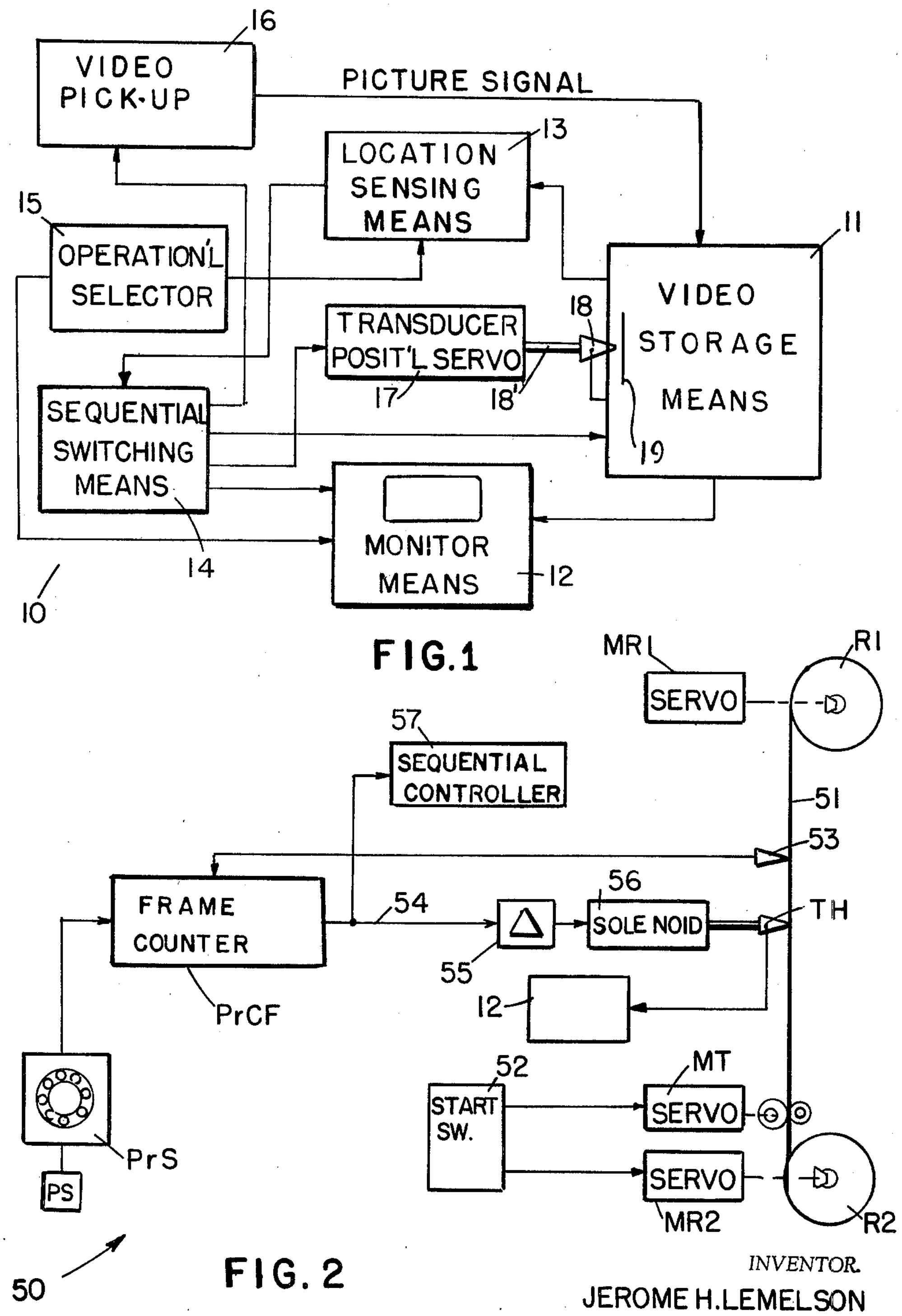
FIG. 1 is a block diagram of a magnetic recording system and monitor means therefore embodying features of the invention.
FIG. 2 is a schematic diagram of a magnetic tape recording system employing transducer heads and means for automatically engaging and disengaging magnetic recording tape with at least certain of said heads when a selected portions of the tape is in alignment with the heads.

Referring to the block diagram illustrated in FIG. 1, a magnetic recording and reproducing system 10 is illustrated which includes a video storage means 11 such as a magnetic recording device operative to magnetically record and reproduce video information and which includes a magnetic recording member 19 movable with respect to one or more magnetic transducers represented by the notation 18.

The output of the video storage means 11 is generated as a picture signal transmitted to a monitor means 12 in response to controls operative to reproduce just selected portions of the recordings provided on the recording member 19. The input to the video storage means 11 is a picture signal generated on the output of the video pickup 16, such as a television camera, which is controlled in its operation by a sequential switching means 14. The sequential switching means, in turn, is controlled by signals generated by a location sensing means 13 which in turn is controlled in part by an operational selector 15.

To effect recording on to predetermined portions of the recording member 19 of the video storage means 11, the operational selector 15 is manually or otherwise adjusted so as to preset the location sensing means 13. In its simplest form the location sensing means includes a predetermining counter-relay operative to receive feedback, marker signals generated as predetermined portions of the magnetic recording member 19 pass the transducing means and to uncount upon receipt of a predetermined number of said signals. The result is a signal generated on the output of the location sensing means 13 which activates the sequential switching means 14.

During the hereinabove described operations the magnetic transducer head or heads 18 are normally retained retracted off the magnetic recording member 19 but are projectable thereagainst to effect transducing when a servo means 17 is energized by a signal output of the sequential switching means 14 which is operative when the selected portion of the magnetic recording member 19 is immediately adjacent or approaching the transducer heads 18. Employing this technique the transducers need not engage the tape until substantially that portion thereof containing the desired information or onto which selected information is to be recorded, is substantially in alignment with the transducing heads.

In FIG. 2 is shown control apparatus 50 for selectively moving one or more magnetic transducers, such as any combination of recording, erasure or reproduction heads associated with magnetic recording or reproduction functions as described herein and in my said copending applications, with respect to a magnetic recording member such as a flexible magnetic tape when the length thereof, containing the signal desired to be reproduced or on which a signal is to be recorded, is approaching the transducers. For example, during the reproduction, such condition may arise when the leading edge or beginning of a signal such as a video picture signal is adjacent the transducer.

The frame selection counter PrCF is first preset to the count corresponding to a desired frame by operation of dial selection switch PrS or other suitable presetting means. Thereafter start switch 52 is actuated starting tape drive motors MT and MR2. Frame marker pulse pickup head 53 transduces frame marker pulse recordings previously recorded to pulse signals which are fed to the feedback input of counter PrCF. The marker pulse recordings indicate the locations of individual frames of the tape on each of which are recorded one or more information signals such as video picture signals.

When the counter PrCF uncounts, it generates a pulse on its output 54 which energizes solenoid 56 causing the transducer head TH, coupled thereto, to advance into operative relationship with the tape. Notation 55 refers to a timer delay line or sequential switching device operative to control solenoid 56 to retain the head TH engaged with the tape for just the time interval necessary to reproduce the selected information from the selected frame or frames of the tape. If the head or heads represented by notation TH are applicable for magnetic recording, control device 55 may be operative to energize and retain solenoid 56 energized maintaining head TH engaged with tape 51 during the interval the frame or frame lengths thereof onto which the selected information is to be recorded are substantially aligned with the tape. Depending on the response characteristics of the solenoid or servo 56 may be operative to advance the transducers TH a short interval prior to arrival of the leading edge of the selected frame or recording at the heads so as to permit reproduction without loss of the entire signal or signals so selected.

The output of PrCF is also connected to the energizing input of a sequential controller 57 operative to stop and/or otherwise effect operation of the tape drive motors MT, MR2 and MR1 following completion of the described transducing function or functions.

Figure 3:
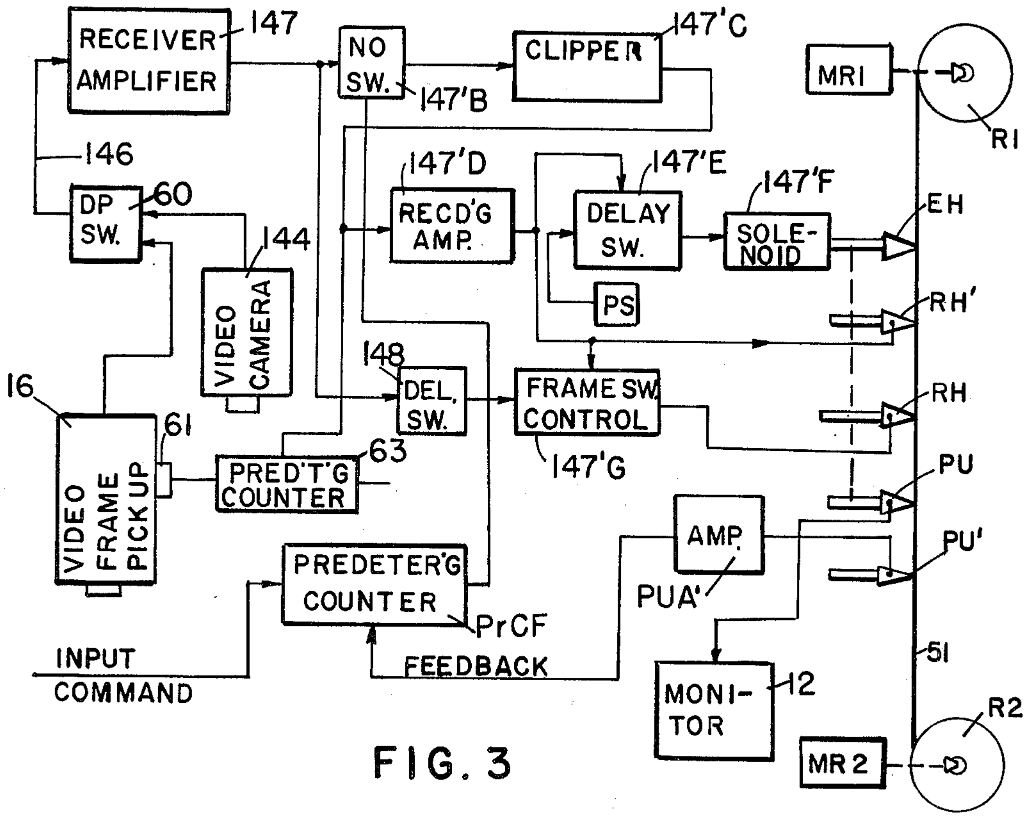
FIG. 3 is a schematic diagram of a magnetic recording system employing features of the invention and applicable for selective recording and reproducing video picture signals with respect to a magnetic tape.

FIG. 3 illustrates further means for controlling the position of one or more of a plurality of magnetic transducers relative to a magnetic recording tape during recording and reproduction functions performed with respect to a selected length of said tape so as not to permit engagement of said heads with other lengths thereof not so selected. An amplifier 147 for video signals has an input 146 extending from a switch 60 having two inputs which respectively are connected to the picture signal outputs of a video pickup 16 and a conventional television camera 144. The video camera 144 is operative to scan and generate picture signals at a frequency determined by line alternating current powering said device or its own timing means and synchronizing signal generator. The video pickup 16 is preferably provided as illustrated in my said copending application and has a trigger input 61 thereto which, when energized by a pulse, signal, is operative to effect one or more complete reading beam scans of the field of its optical system so as to generate one or more complete frames of video picture signals in which each signal is generated in scanning a starting location of the image field. Thus the output of either controlled video pickup 16 or free running camera 144 may be connected to the input 146 and receiver amplifier 147 depending on the state of the double pole switch 60 which may be manually or otherwise actuated.

In operating the apparatus of FIG. 3, the frame selection counter PrCF is preset by manual or other means and the proper tape drive motors MT and MR2 are energized to drive the tape 51 in the proper direction. A frame reproduction transducer PU′ reproduces frame marker pulses from the tape which generate marker feedback signals which are amplified in pickup amplifier PUA′ and are transmitted to the uncounting input of the counter PrCF. Upon uncounting, counter PrCF generates a pulse on its output which is transmitted to the switching input of a normally open switch 147′B. The switch 147′B is connected between the output of amplifier 147 and a differentiator clipper 147′C which passes its output therethrough to said clipper differentiator which is operative to clip the next frame vertical sync pulse from the composite video signal. The clipped vertical sync pulse is passed from clipper circuit 147′C to a pulse amplifier 147′D which amplifies same and passes it to a switching controller 147′E for controlling solenoid or servo 147′F to advance and retract the transducer heads EH, RH, RH′, PU, and PU′. Both switches 147′B and 147′E contain respective means for delaying return to the normally open conditions. The switch 147′B is preferably an electron tube or solid state pulse activated switching device operative to open after closing at a time interval such that it will be assured that at least one frame vertical sync pulse will pass therethrough from either free running video camera 144 or video scanner pickup 16. The switch 147'E has a built-in time delay constant such that energizing power generated by a power supply PS will be passed to the solenoid 147'F for a sufficient time interval to maintain the magnetic head or heads against the tape for the desired time interval. Such interval may be substantially the time it takes for the selected information or frame to pass the heads or multiples thereof. Accordingly, the delay switch 147'E is preferably adjustable in its delay constant that the operator of the apparatus may select one or a plurality of frame lengths on which to record a plurality of picture signals or from which to reproduce a plurality of selected picture signals depending on how the various reproduction and recording transducers are activated.

The output of video picture signal amplifier 147 is shown connected through a delay relay or delay line 148 to the input of a switch 147'G which is operative to pass one or a selected number of video picture signals generated in scanning one or more fields of video information. In other words, switch 147'G, like switches 147'B and 147'E is a normally open, mono-stable electronic switch which is slow-to-open after closing by a degree sufficient to permit the passage therethrough of a video picture signal derived in scanning one complete frame of its image field or a selected plurality of such frame scans. Accordingly, switch 147'G is preferably manually or otherwise adjustable to open after being closed at time intervals which are multiples of the time it takes the beam of video scanning devices 16 or 144 to effect the scanning of a complete image field.

If it is desired to record picture signals generated on the output of free running television camera 144, switch 60 is operated so that the output 145 of 144 is connected to input 146 of receiver amplifier 147. If it is desired to record frame picture signals, the leading edges of which will each appear at the recording head RH when the selected length of the magnetic tape is aligned with said head, the trigger input 61 to the video scanning device 16 is energized by the pulse generated when the counter PrCF uncounts.

Notation 63 refers to a counter operated switch disposed in the circuit between PrCF and trigger input control 61 to the video scanner 16. The counter 63 is operative to energize trigger 61 after receipt of a plurality of pulses from the clipper differentiator 147'C so as to account for the time delay required to advance the magnetic transducers by the electro-mechanical solenoid 147'F. In other words, since the solenoid 147'F does not operate until an interval after a frame vertical sync pulse appears on the output of clipper differentiator 147'C, which sync pulse is that generated by a frame video picture signal produced in advance of the signal to be actually recorded, a plurality of frame picture signals must be generated by either scanner 16 or 144 during a recording cycle with at least one of said frame picture signals generated prior to advancing the magnetic transducers against the tape to account for the time lag in operating the solenoid.

Other features of the apparatus of FIG. 3 for effecting frame video signal recordings are not shown in FIG. 3 as they do not form an important part of this invention but are illustrated in greater detail in my said copending applications and include means operative after effecting a recording or reproduction function, for further controlling movement of the tape to stop or reverse the direction of travel thereof prior to the next recording or reproduction function.

Figure 4:
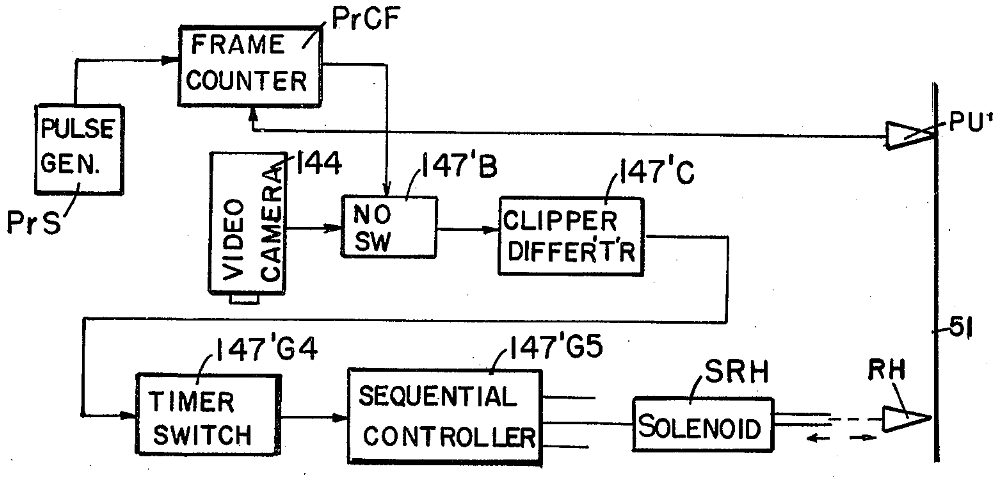
FIG. 4 is a schematic diagram showing a modified form of the system of FIG. 3.

In FIG. 4 another mode of operation is illustrated. In said drawing arrangement, when frame counter PrCF uncounts, it is operative to close normally open switch 147'B passing the output of video camera 144 through said switch to a clipper differentiator 147'C, the output of which is the clipped frame vertical sync signal. This pulse is passed to energize a timer 147'G4 which generates two pulses 1/30th of a second apart of the normal interval of time required for passage of a complete frame video picture signal. The first pulse energizes a controller switching device 147'G5 which sequentially operates a solenoid SRH advancing the recording transducer RH and/or other transducers provided on the same mount as RH such as an erasure transducer EH, pickup transducer PU, etc. whichever may be employed against the tape at the selected frame and retracting same a predetermined time delay thereafter so that the head will be engaged along only substantially that length of the tape at which transducing occurs.

In the drawings provided herein, where not shown, it is assumed that the correct electrical power supplies are provided on the correct sides of all switches, relays, motors, delays and the other devices illustrated and that diode and similar control means are provided where necessary to effect the described operations. It is also noted that detailed explanations of many block notations used in this specification are found in my aforesaid copending applications 142,748 and 225,173 as well as the parent applications thereof.

I claim:

1. A signal transducing device of the class described including a magnetic storage member, a plurality of frames of video information magnetically recorded on said storage member, frame indicating signals magnetically recorded on said storage members, a magnetic transducing head means for reading said video information, a transport means for moving said storage member past said head means, and additional means for relatively moving said head means and said storage member between first and second relative positions with respect to each other, said head means when said first relative position is attained being adjacent to said storage member in transducing relation with respect thereto, said head means when said second relative position is attained being remote from said storage member with a gap between said head means and said member, locations sensing means including a pickup head in operative relationship with respect to said storage member to read said frame indicating signals and an input to which said frame indicating signals are fed by said pickup head, said location sensing means also including a selector means, said location sensing means generating an output signal after receiving a pattern of said frame indicating signals, said pattern being predetermined by said selector means, and further means operative in response to receipt of said output signal to automatically operate said additional means to relatively move said head means and said storage means to establish said first relative position when a preselected portion of said storage member is opposite said head means and to maintain said head means and said storage means in said second relative position when other portions of said storage member are opposite said head means, said further means including portions operative to automatically relatively move said head means and said storage means to establish said second relative position at a predetermined time after said first relative position is established, said first relative position remaining established for a time interval during which information transduced from said storage means by said head means is sufficient to produce a still picture output, and monitor means connected to said head means for transforming said video information into a visual presentation.

2. A device as set forth in claim 1, in which the storage member comprises a magnetizable strip.

3. A device as set forth in claim 1, in which the further means includes an operating solenoid.

4. A device as set forth in claim 3 in which the head means is moved to attain said first relative position when said solenoid is energized.

References Cited

UNITED STATES PATENTS

| | | | |
|---|---|---|---|
| 2,514,578 | 7/1950 | Heller et al. | 179—100.2 |
| 2,703,714 | 3/1955 | Demby et al. | 179—100.2 |
| 2,683,568 | 7/1954 | Lindsay | 179—100.2 |
| 2,927,975 | 3/1960 | Jamieson | 179—100.2 |
| 2,965,720 | 12/1960 | Bumstead et al. | 179—100.2 |

FOREIGN PATENTS

| | | |
|---|---|---|
| 810,111 | 3/1959 | Great Britain. |

TERRELL W. FEARS, Primary Examiner

J. R. GOUDEAU, Assistant Examiner

U.S. Cl. X.R.

179—100.2; 340—174.1